(12) United States Patent
Nakamura et al.

(10) Patent No.: US 8,386,211 B2
(45) Date of Patent: Feb. 26, 2013

(54) MONITORING VIRTUAL WORLDS TO DETECT EVENTS AND DETERMINE THEIR TYPE

(75) Inventors: Megumi Nakamura, Yamato (JP); Mika Saito, Yamato (JP); Shoko Suzuki, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 12/192,693

(22) Filed: Aug. 15, 2008

(65) Prior Publication Data
US 2010/0042364 A1 Feb. 18, 2010

(51) Int. Cl.
G06F 12/00 (2006.01)
G06F 12/04 (2006.01)
G06F 12/06 (2006.01)
G06F 3/01 (2006.01)

(52) U.S. Cl. ......... 702/179; 702/182; 702/183; 702/186

(58) Field of Classification Search ............... 702/4, 5, 702/19, 20, 31, 33, 34, 41, 42, 153, 179, 702/182, 183, 188; 345/419; 382/181; 73/19.01; 463/31
See application file for complete search history.

(56) References Cited

U.S. PATENT DOCUMENTS

| | | | | |
|---|---|---|---|---|
| 5,432,895 A * | 7/1995 | Myers | | 345/419 |
| 5,923,324 A * | 7/1999 | Berry et al. | | 715/852 |
| 6,266,062 B1 * | 7/2001 | Rivara | | 345/419 |
| 6,426,757 B1 * | 7/2002 | Smith et al. | | 345/634 |
| 7,308,139 B2 * | 12/2007 | Wentland et al. | | 382/181 |
| 7,428,588 B2 * | 9/2008 | Berstis et al. | | 709/224 |
| 8,103,445 B2 * | 1/2012 | Smith et al. | | 701/425 |
| 2005/0062738 A1 * | 3/2005 | Handley et al. | | 345/419 |
| 2007/0044539 A1 * | 3/2007 | Sabol et al. | | 73/19.01 |
| 2009/0247297 A1 * | 10/2009 | Nakamura et al. | | 463/31 |
| 2009/0265642 A1 * | 10/2009 | Carter et al. | | 715/757 |

* cited by examiner

Primary Examiner — Michael Nghiem
Assistant Examiner — Felix Suarez
(74) Attorney, Agent, or Firm — Lieberman & Brandsdorfer, LLC (57) ABSTRACT

A method, apparatus, and article of manufacture are provided for detecting events based upon population density as a function of time and geographic location. Flow of population enables continuous movement to be distinguished from non-continuous movement. Accordingly, various types of events where people are gathering may be determined based upon the population flow and density.

20 Claims, 8 Drawing Sheets

|  | Characteristic | Event Type |
|---|---|---|
| Size | Event center | Open space event |
|  | Event neighborhood and event center | Wide gathering; an event with a large impact; an event where people gather directly |
| Structure | One event center and event neighborhood | Integrated and uniform |
|  | Multiple event centers and event neighborhood | Event with several hot spots or incidental overlapping two or more events |
|  | Multiple event centers with higher thresholds in event center | Event with multiple hot spots |
| Shape | Circular | Event where people gather |
|  | Hollow center | Spectator event |
|  | Semi-circle | gathering place with an obstacle |
|  | Linear | Event viewed from the side |

MONITORING VIRTUAL WORLDS TO DETECT EVENTS AND DETERMINE THEIR TYPE

BACKGROUND OF THE INVENTION

1. Technical Field

This invention relates to detecting events in a virtual world. More specifically, the invention relates to evaluating population density and changes in population density in the virtual world to detect events.

2. Description of the Prior Art

A virtual world is a computer-based simulated environment that enables users to inhabit and interact with other users. In the virtual world, a computer user's self representation is known as an avatar. This habitation usually is represented in the form of two or three-dimensional graphical representations of humanoids (or other graphical or text-based avatars). Some, but not all, virtual worlds allow for multiple users. The virtual world being computer-simulated typically appears similar to the real world, with real world rules such as gravity, topography, locomotion, real-time actions, and communication. Recently communication has been in the form of text, and is evolving to real-time voice communication using voice over internet protocol (VOIP).

Virtual worlds are well-known as being fantasy spaces sealed off from the real world. In the virtual world, residents create an identity, meet people, etc. Each resident in the virtual world is known as a second life. In one embodiment, the virtual world with its residents can be thought of as a massive multi-player online role playing game. It is known that real world companies use the virtual world to introduce new products, and use the feedback received in the virtual world for introduction of products in the real world. Accordingly, the boundaries between the real and virtual worlds are quite porous.

Participants constantly arrive and depart from the virtual world, carrying with them their unique set of behavioral assumptions and attitudes that cannot be disentangled from their interactions in the virtual world. The number of users that participate in virtual worlds is expected to increase in the future. An increase in the virtual world is envisioned to be more difficult to find events in which a user wants to participate. One method of detecting events or locales for participants is by listing the areas where people are virtually gathered. However, this method does not detect the virtual locales before they become popular, nor does it detect locales that are in the process of being vacated.

Based upon the cross-over between the real world and the virtual world, there is a need to assess behavior in the virtual world, as this may impact behavior in the real world. The example of product introduction discussed above is a benign cross-over between the two worlds. However, there may be cross-over activities between the two worlds that are dangerous. As in the real world, it is advantageous to predict dangerous activities before the damage emanating from the activities occurs. Accordingly, there is a need to monitor and evaluate places of interest in the virtual world as the interest is developing and prior to conclusion of activities associated with the places of interest.

SUMMARY OF THE INVENTION

This invention comprises a method, system, and article for evaluating behavior in the virtual world based upon characteristics of population data and shifts in population over time.

In one aspect of the invention, a method is provided for detecting an event in a virtual world. The world is divided into a plurality of detailed areas, and population density data and movement information for each of the detailed areas is acquired. Based upon the acquired data, a population density index is calculated; and based upon the population density index; a change in population density index is calculated for each unit of time together with a calculation of a quantity of entries indexed into one of the detailed areas at a specific time. Thereafter, a threshold value is set for the population density index; a threshold value is set for the change in population density index; and a threshold value is set for the quantity of entries index. An event is detected in at least one of the detailed areas responsive to any one of the calculated indexes exceeding its set threshold value.

In another aspect of the invention, an article is provided with a computer-readable carrier including computer program instructions configured to detect an event in a virtual world. Instructions are provided to divide the world into a plurality of detailed areas and to acquire population density data and movement information for each of the detailed areas. In addition, instructions are provided to calculate a population density index, and based upon the population density index; calculate a change in population density for each unit of time. Instructions are also provided to calculate a quantity of entries index into one of the detailed areas at a specific time. In association with the calculation instructions, another set of instructions are provided to set a threshold value for the population density index, for the change in population density index, and for the quantity of entries index. An event is detected in at least one of the detailed areas responsive to any one of the calculated indexes exceeding its set threshold value.

In yet another aspect of the invention, a computer system is provided with a processor in communication with memory, and a storage device in communication with the processor. In one embodiment, the storage device stores population data. The virtual world is divided into a plurality of detailed areas. A manager is provided in communication with the memory. The manager acquires population density data and movement information for each of the detailed areas. In addition, the manager calculates a population density index, and based upon the population density index, calculates a change in population density index for each unit of time and a quantity of entries index into one of the detailed areas at a specific time. Threshold values are employed to determine characteristics of the population in association with the detailed areas. A threshold value is set for the population density index, the population density index, and the quantity of entries index. An event is detected in at least one of the detailed areas responsive to any one of the calculated indexes in excess of a set threshold value.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

It will be readily understood that components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. In one embodiment, the manager may be implemented in programmable hardware devices, such as field programmable gate arrays, programmable array logic, programmable logic devices, or the like. The managers may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of mesh region managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, system, and processes there are consistent with the invention as claimed.

Overview

Events are estimated and detected in the virtual world based upon population density. More specifically, population density is a function of time and geography. Population movement is divided into two categories, including continuous movement and non-continuous movement. Various types of events are determined by population movement.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Figure 1:
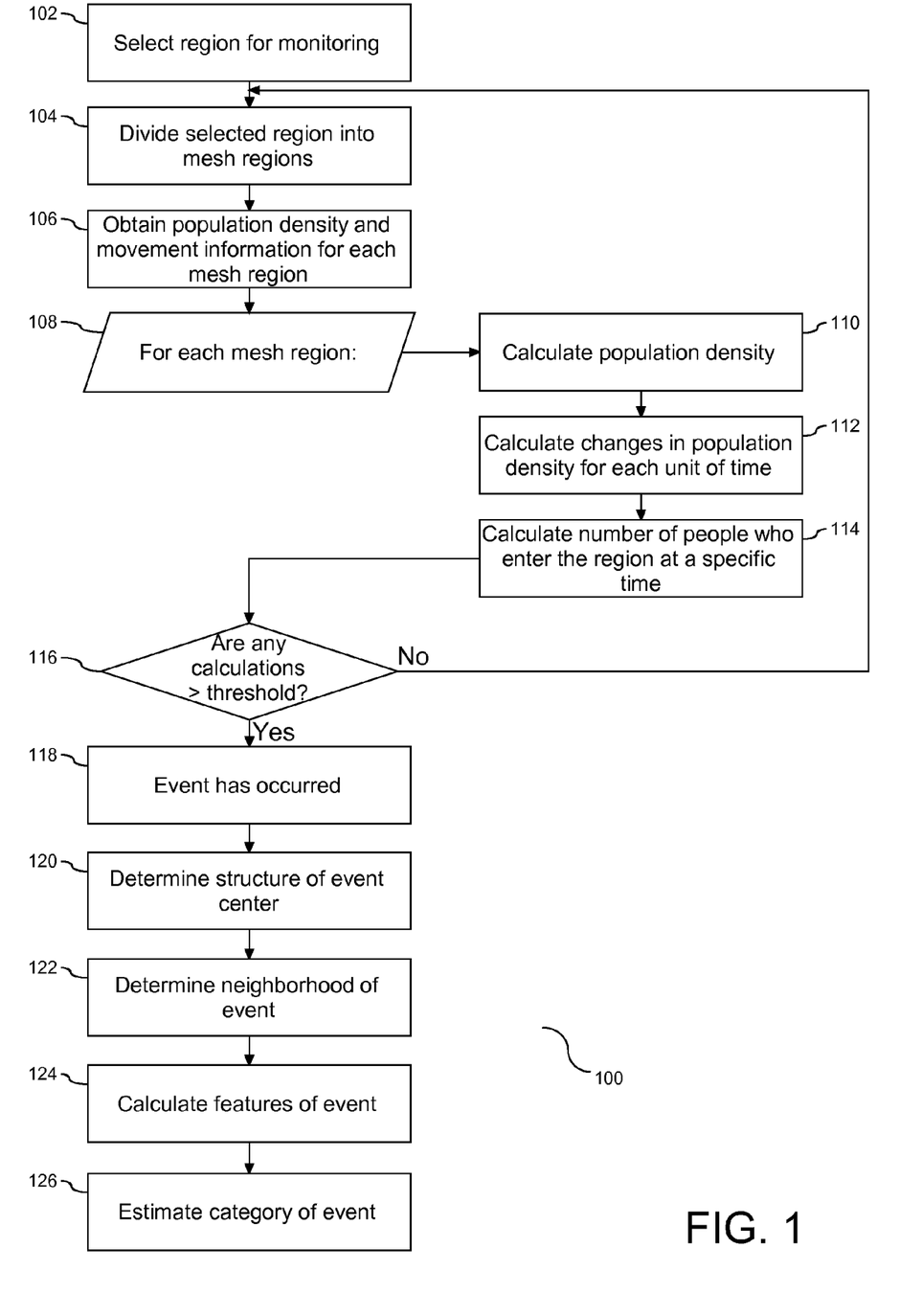
FIG. 1 is a flow chart illustrating a process for detecting locations in the virtual world that are exposed to activity based upon shifts in population, according to the preferred embodiment of this invention, and is suggested for printing on the first page of the issued patent.

As discussed above, detecting events in the virtual world prior to the occurrence of the event is difficult. The same can be said for events in the real world. Time is an evolving factor, and nobody can predict the future with certainty. However, activities in the present time can be monitored and evaluated to predict activities in the future based upon present and past actions. FIG. 1 is a flow chart (100) illustrating a process for detecting of locations in the virtual world that are exposed to activity based upon shifts in population. The detection of the subject locations are ascertained before the locations become popular. The process shown in FIG. 1 tracks flow of traffic in the virtual world.

There are three primary elements involved in the location prediction algorithm, and they include detecting events, determining the size of the event, and estimating the event type. The first of the three primary elements is outlined in steps (102)-(116). As shown, initially the region of the virtual world that is the subject of being monitored is selected (102), followed by dividing the region into smaller regions hereinafter referred to as mesh regions (104). Each granular region of focus in the virtual world is referred to as a mesh region. The population density and movement information is obtained for each mesh region (106). In one embodiment, the data gathered at step (106) is obtained from a server that stores this information. The aspect of obtaining movement information may be in the form of movement associated with URL specification. The population density, n, is a function of both time, t, and area, I, hereinafter referred to as n(I, t). In other words the population of a mesh region is based upon the area being measured at a point in time, and is subject to change as population enters and exits the subject area. Based upon the data gathered at step (106), the following data is calculated for the subject mesh regions (108): population density (110), changes in the population density for each unit of time (112), and the number of people who enter each subject region at a specific time (114). Based upon the calculations at steps (110)-(114), it is then determined if any of the calculations have exceeded a set threshold value associated with the calculation (116). In one embodiment, a specified threshold is an event trigger. If the response to the determination at step (116) is negative, the process returns to step (104) as this is an indication that the mesh region(s) being evaluated is too large and needs to be adjusted to one or smaller mesh regions. However, a positive response to the determination at step (116) is an indication that an event is considered to have occurred in the subject mesh regions (118). Accordingly, the first part of the location detection process divides the virtual environment into mesh regions of interest and starts evaluating traffic flow into and out of the subject mesh regions.

Once an event has been detected at step (118), the structure of the event center (120) is determined. Details of the process of determining the event size are described in detail FIG. 2. Based upon the calculated structure of the event center, the neighborhood of the event is determined (122). Details of the process of determining the event center are described in detail in FIG. 3. However, for purposes of disclosure, the broader aspects of the size determination are described as follows. The mesh region(s) that exceed the set threshold are specified as the event center, which is further divided into smaller areas in order to determine the structure of the event. In addition, the areas adjacent to the smaller areas are also searched; these adjacent areas are defined as neighborhood areas as they neighbor the event center. The number of people who enter the area of the neighborhood at a specific time is calculated. Thereafter, the minimum neighborhood area is acquired when the sum of the number of people who enter the event center and the number of people who enter the neighborhood at a specific time is zero. This calculated minimum neighborhood area is determined to be the neighborhood of the event. After the structure of the event center has been determined at step (122); the features of the event are calculated (124); the category of the event is estimated (126). The process of calculating the event features include acquiring the characteristic quantities for the event center and the event neighborhood. Based upon the features of the event, the event type, i.e. category, is estimated. There are various landmarks employed to categorize the event type, includes the changes in population density for a unit of time, and the number of people who enter a specific area at a specific time. For example, when the event initiation is deemed to be caused by the change in population density for a unit of time, it is interpreted that the event has an external causation. An example of an external causation may include a large number of people entering the subject area via a URL specification. Conversely, when the event initiation is deemed to be caused by the number of people who walk to enter the subject area at a specific time, this is interpreted that the event has an internal causation. An example of an internal causation may include people gathering with continuous movement. In one embodiment, a positive value to formula result that leads to the internal causation is considered to be an attracting event, and a negative value associated with the result may be considered to be a repelling event. Accordingly, it is the categorization of the event that is employed to predict the types of events that are the force employed to gather people to a locale.

Figure 2:
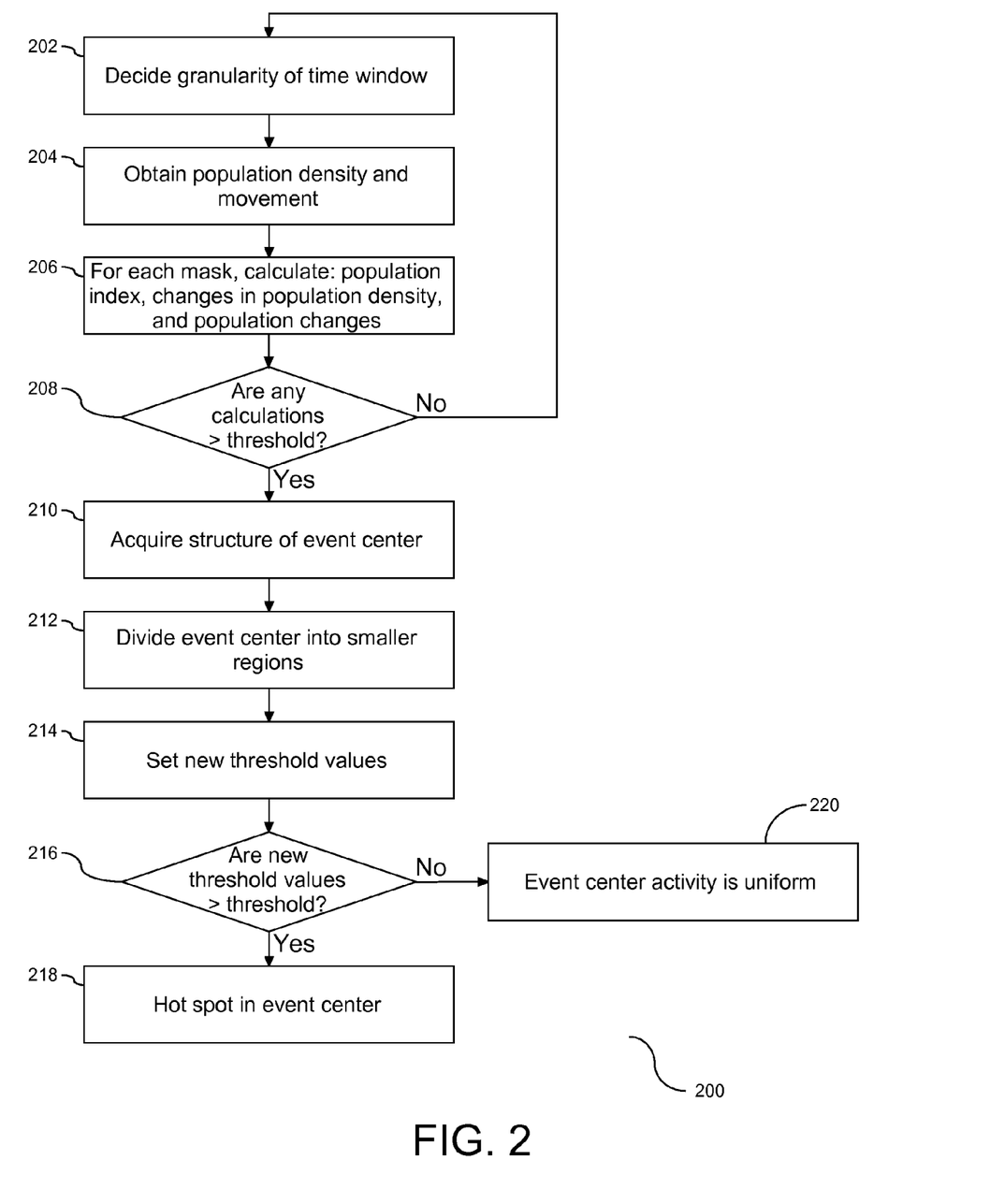
FIG. 2 is a flow chart illustrating the process of determining the size of the event center.

As shown in FIG. 1, both an event center and a neighborhood for the event center are ascertained. Both the event center and the associated neighborhood are used to determine the size of the event. FIG. 2 is a flow chart (200) illustrating the process of determined the size of the event center. The event detection phase shown in FIG. 1 has already calculated the population density, change in population density with respect to time, and population. The granularity of the time window and the area for each mesh is decided (202). The population density and movement information is obtained for each mesh (204). Based upon the data received at step (204), the population density index is calculated for each mesh, changes in the population density for each unit of time is calculated, and the population change is calculated for each mesh (206). Following the calculations at step (206), it is determined if any of the results exceeds a set threshold (208). In one embodiment, the threshold is a user defined value. A negative response to the determination at step (208) is an indication that an event center has not been detected, and the process returns to step (202) to further divide the subject mesh region(s) into one or more smaller regions. Conversely, a positive response to the determination at step (208) is an indication that an event center has been detected, and the structure of the event center is acquired (210). The acquired event center is divided into smaller mesh regions (212), and the new threshold values are set for population density, changes in population density, and population change (214). In one embodiment, the new threshold values for the smaller meshes are set higher than the value of the threshold for event detection. It is then determined if any of the threshold values for any of the smaller meshes for any of population density, changes in population density, and population change exceed the respective threshold value (216). A positive response to the determination at step (216) is an indication that there is a hot spot of activity in the event center (218). Conversely, a negative response to the determination at step (216) is an indication that the activity within the event center is relatively uniform (220), i.e. the event center has a uniform structure with no apparent hot spot of activity. Accordingly, by applying a further granular characteristic to the mesh, it may be determined if there is a hot spot of activity within the granularity of the mesh.

In addition to determining a hot spot of activity, it is also important to determine and define the neighborhood of the activity. There are two methods for determining the neighborhood of the activity. One of the methods is shown in detail in FIG. 3, and is recognized as an enlargement method. In one embodiment, the enlargement method is appropriate for acquiring neighborhood areas with non-uniform or complicated shapes. Initially, the mesh regions that are next to the event center are selected (302). In one embodiment, the mesh regions that are adjacent to already selected mesh regions and have a determined large number of people entering the area at a specific time are added to the selected neighborhood. Following the selection(s) at step (302), the population change values of the selected mesh regions and of the event center are aggregated (304). It is then determined if the population change values is less than or equal to zero or if the variation of the population change is small compared to the prior population change value prior to the expansion of the neighborhood (306). A negative response to the determination at step (306) is followed an expansion of the neighborhood area. The mesh that has the smallest population change among the edge of the already select neighborhood is chosen (308), and the meshes next to the chosen mesh are selected (310). The population change of the meshes selected at step (308) and (310) are summed, and the process returns to step (306). The process of expanding the neighborhood continues until the total population change of each selected mesh regions is zero (312), as demonstrated by a positive response to the determination at step (306). Following a positive response to step (306), the selected mesh regions at step (320) are considered the event neighborhood (314). Accordingly, in one embodiment, the neighborhood of the event center is enlarged until the population change of the aggregate of the subject mesh regions is at or near zero.

Figure 4:
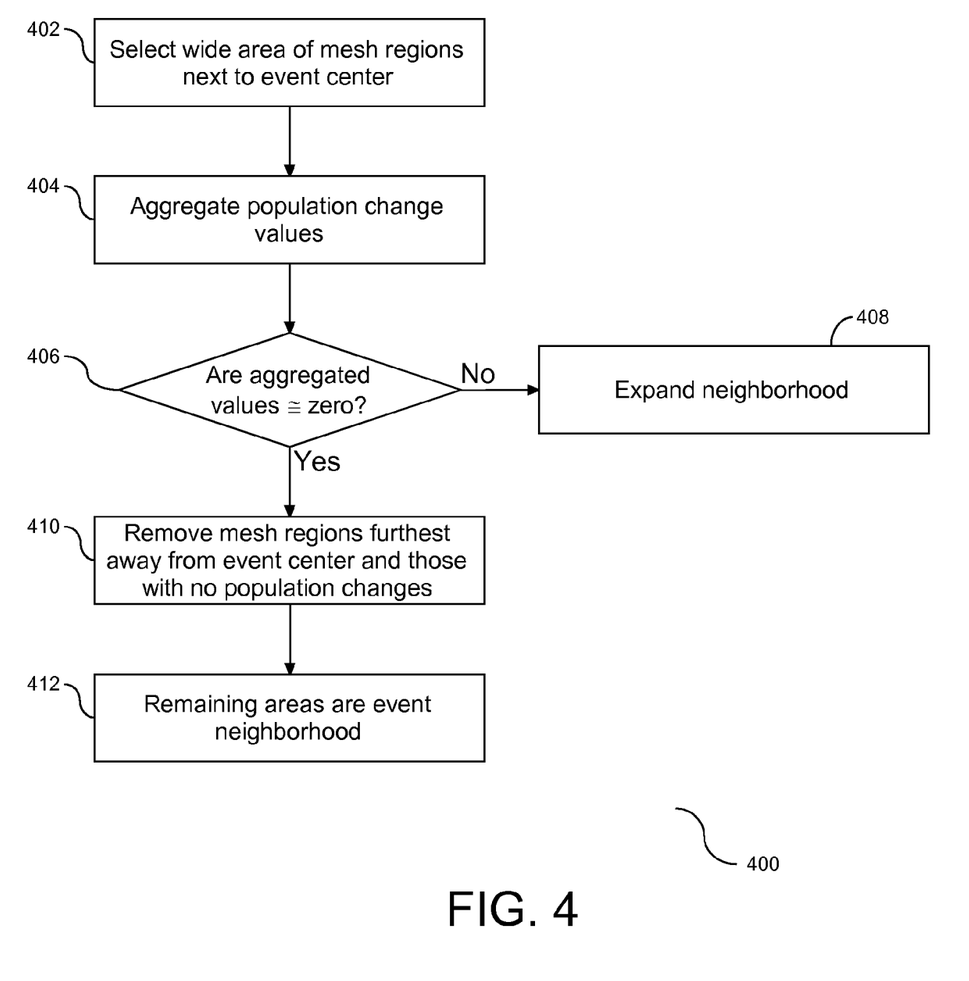
FIG. 4 is a flow chart illustrating a shrinkage procedure for determining the neighborhood of activity.

In addition to a neighborhood enlargement method, the neighborhood of an event may be calculated by shrinking the subject mesh regions of the subject neighborhood. For example, the subject neighborhood may be considered to include a large quantity of mesh regions, and as such, it may be desirable to reduce the quantity of subject mesh regions as a tool to further define the neighborhood boundaries. FIG. 4 is a flow chart (400) illustrating a process for reducing the quantity of mesh regions in a neighborhood. In one embodiment, this process is appropriate for acquiring an event neighborhood with a robust shape without noise. Initially, the wide area of mesh regions that are next to the event center are selected (402). The population change values of each of the selected mesh regions and the event center are aggregated (404). It is then determined if the value of the aggregation at step (404) equals or is otherwise close in value to zero (406). A negative response to the determination at step (406) is followed by an expansion of the neighborhood area (408) and a return to step (402). However, a positive response to the determination at step (406) is followed by removal of those mesh regions that are furthest away from the event center and those that have a value of zero for the population changes (410). Following the removal(s) at step (410) the remaining selected areas are returned as the neighborhood of the event (412). Accordingly, the neighborhood surrounding an event center may be reduced to further define the event center.

Figure 3:
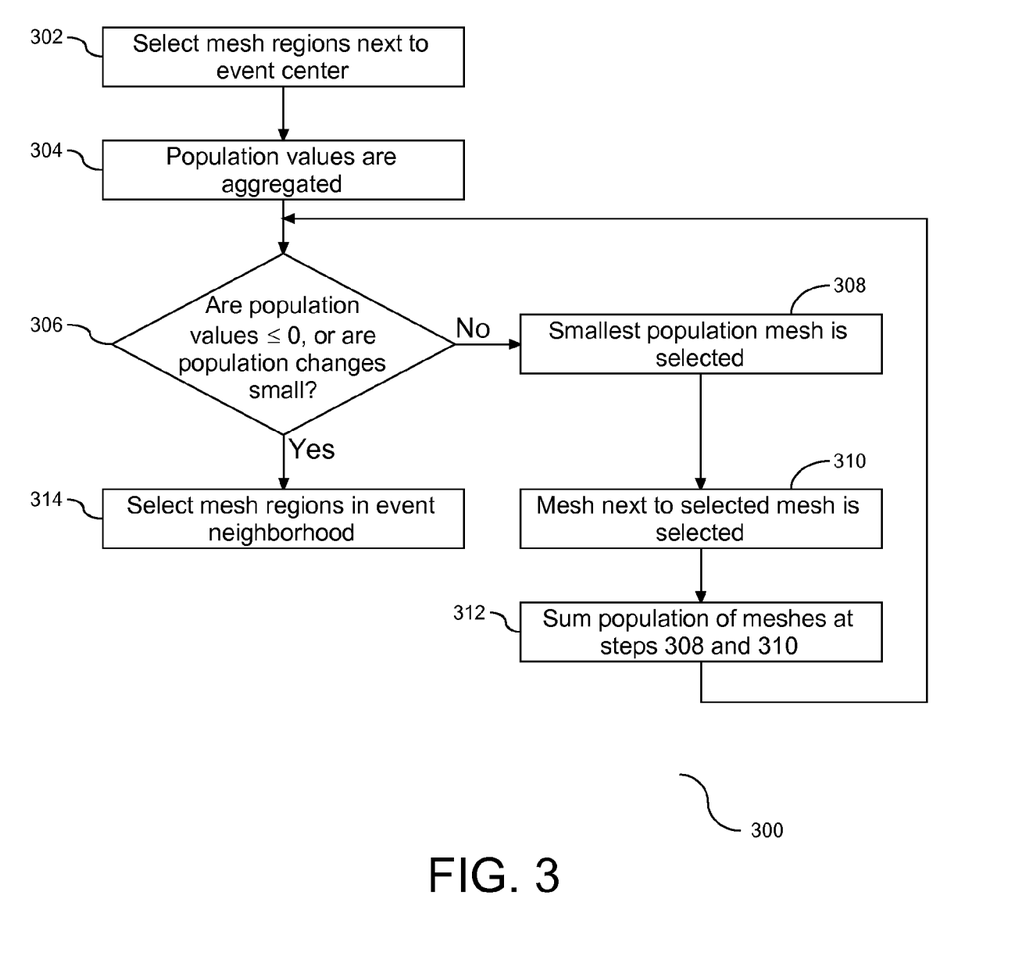
FIG. 3 is a flow chart illustrating an enlargement procedure for determining the neighborhood of activity.
Figure 5A:
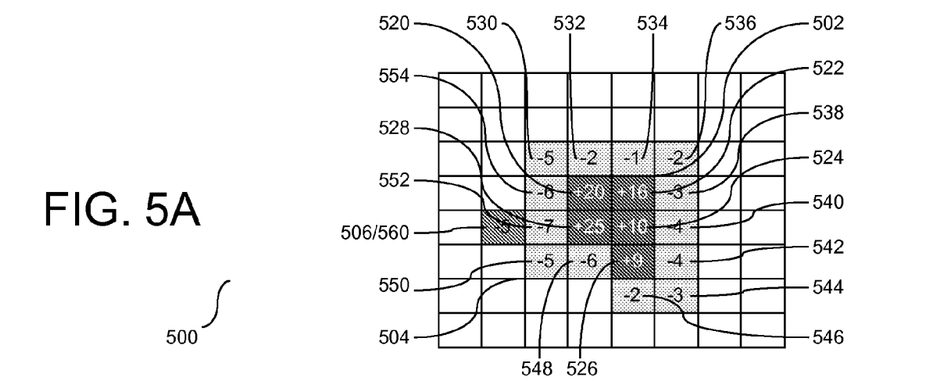
FIGS. 5A-5D are block diagrams illustrating an example of the calculation employed in the enlargement method demonstrated in FIG. 3.

FIG. 5A is a block diagram (500) illustrating an example of the calculation employed in the enlargement method demonstrated in FIG. 3. There are three regions shown in the diagram. The first region (502) is defined as the event center; the second region (504) is defined as the region adjacent to the event center; and the third region (506) is defined as the outer region. Through the neighborhood enlargement method, the event center (502) is composed of those meshes whose population values exceed a defined threshold. In this example, there are four mesh region (520), (522), (524), and (526) that comprise the first region (502). Each of these four meshes (520)-(526) has the population value shown in the mesh. In this example, the population value of each mesh region is shown in the subject region. The second region (504) is shown with thirteen distinct mesh regions (530)-(554). As in the first region (502), each mesh region (530)-(554) in the second region (504) has the population value shown in the mesh. In the example shown herein, each mesh region (530)-(554) in the second region (504) has a negative population value. The third region (506) in this example is shown with one mesh region (560), with the population value shown therein.

Figure 5B:
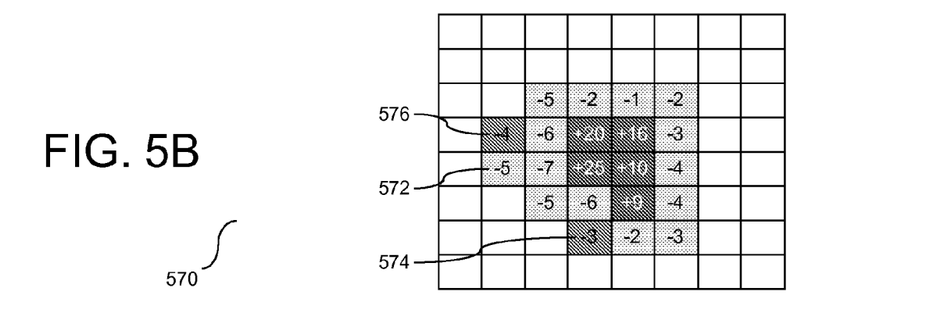

Based upon the algorithm illustrated in FIG. 3, the neighborhood is enlarged until the sum of the population values of the mesh regions of the event center and the outlying neighborhood is near or equal to zero. FIG. 5B is a block diagram (570) showing an initial enlargement of the neighborhood(s) of FIG. 5A. For purposes of ease of disclosure, the same number designations will be repeated for the same mesh regions employed in the neighborhood enlargement process. As shown, the first region (502) includes the same quantity of mesh regions as shown in FIG. 5A. The second region (504) has an additional mesh region (572), which was the sole mesh region (560) in the third region (506) of FIG. 5A. The third region (506) is expanded to include two additional mesh regions (574) and (576). In the example shown herein, the first neighborhood expansion does not meet the definition of a neighborhood. More specifically, in one embodiment, the summation of the population change is not at or near zero.

Figure 5C:
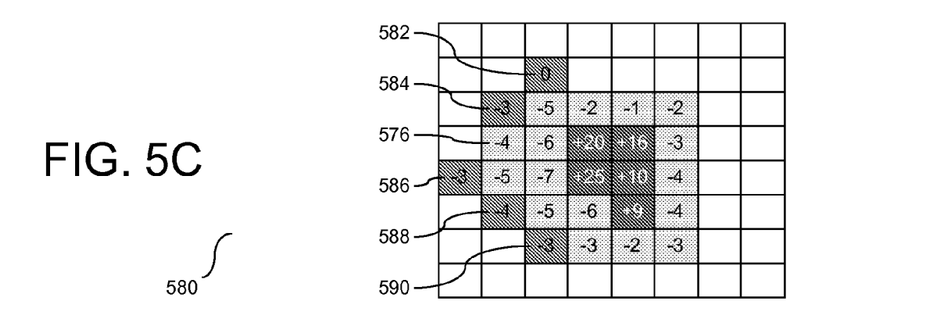

FIG. 5C is a block diagram (580) showing a second enlargement of the neighborhood based upon the boundaries defined in FIG. 5B. As shown, the first region (502) is the same size and includes the same mesh regions as the neighborhood defined in FIG. 5A. The second region (504) is modified to include the mesh region(s) of the first expansion. More specifically, the second region (504) is modified to include mesh regions (574) and (576). A new third region (506) is provided as an expansion of the modified second region (504) to include an additional five mesh regions (582), (584), (586), (588), and (590). The population value of each of the additional mesh regions (582)-(590) are shown in the box representing the mesh region. In the example shown herein, the second neighborhood expansion does not meet the definition of a neighborhood based upon the changes in population of the subject mesh regions. Accordingly, a further expansion of the neighborhood is required to further define the boundaries.

Figure 5D:
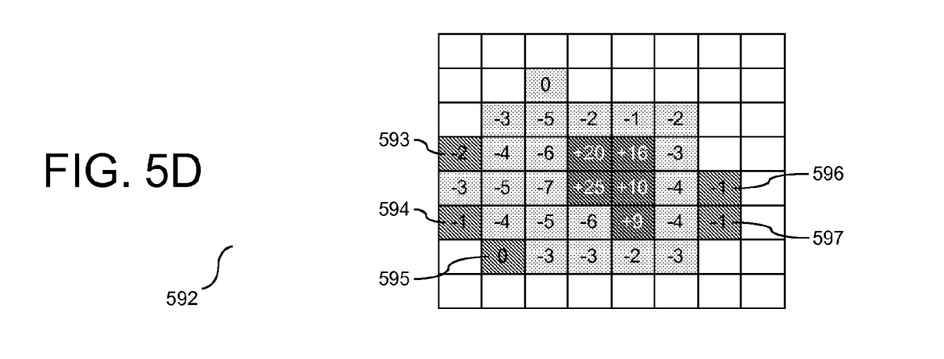

FIG. 5D is a block diagram (592) showing a third enlargement of the neighborhood based upon the boundaries defined in FIG. 5C. As shown, the first region (502) is the same size and includes the same mesh regions as the neighborhood defined in FIG. 5A. The second region (504) is modified to include the mesh region(s) of the second expansion. More specifically, the second region (504) is modified to include mesh regions (582)-(590). The population value of each of the additional mesh regions (582)-(590) are shown in the box representing the mesh region. A new third region (506) is provided to expand an additional five meshes (593), (594), (595), (596), and (598). The population of each of the additional mesh regions (593)-(596) is shown in the box representing each mesh. In the example shown herein, the third neighborhood expansion meets the definition of a neighborhood based upon the changes in population of the subject mesh regions. Accordingly, as shown herein the third expansion completes the neighborhood expansion process and defines the boundaries of the neighborhood.

Figure 6A:
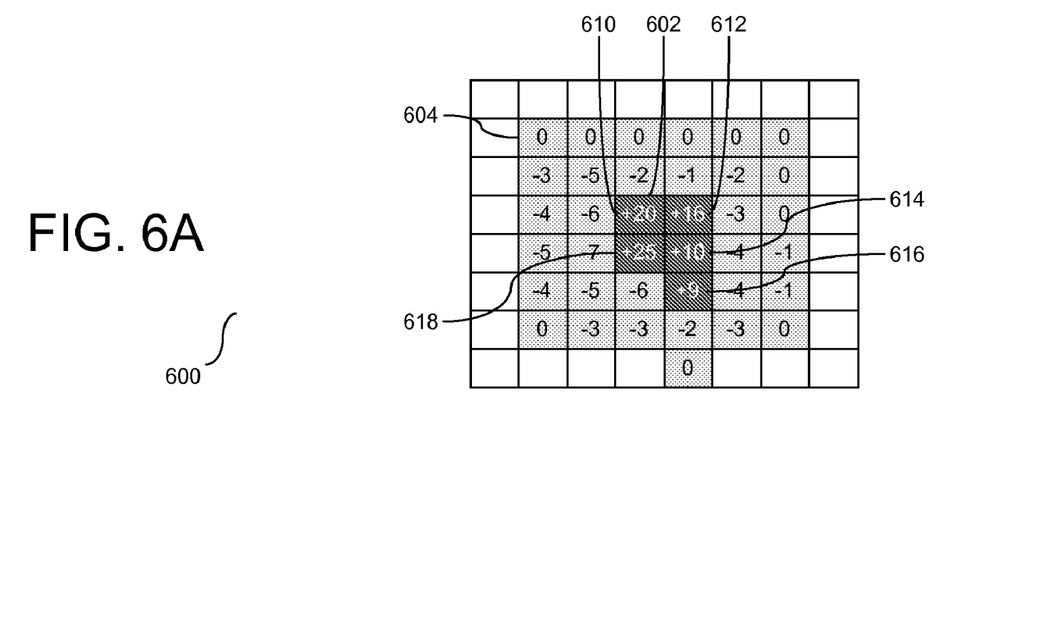
FIGS. 6A-6B are block diagrams illustrating an example of the calculation employed in the neighborhood reducing method demonstrated in FIG. 4.
Figure 6B:
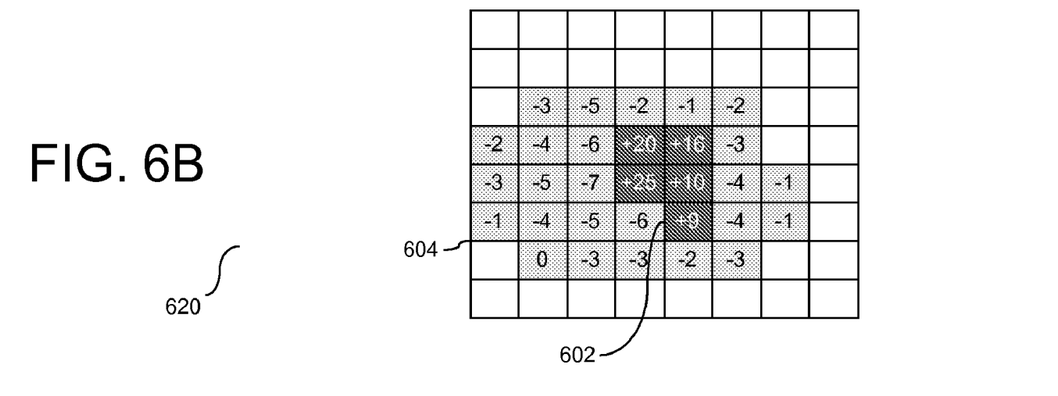

As demonstrated in FIG. 4, the neighborhood may be reduced to define the boundaries thereof. FIG. 6A is a block diagram (600) of a neighborhood prior to reducing the size thereof. As shown, there is an event center region (602) with five mesh regions (610), (612), (614), (616), and (618). Each of the mesh regions (610)-(618) has the associated population value shown therein. The event center is composed of those mesh regions whose population values exceed a defined threshold. Adjacent to the center region (602) is a second region (604) which forms the neighborhood. As shown herein, the neighborhood of the second region (604) has several mesh regions with a population value of zero. As shown at step (404) of FIG. 4, the population values of the center mesh regions and the selected non-center regions are summed. For each summation that is equal to zero or a relatively small number, the subject non-mesh center regions are removed from the neighborhood. FIG. 6B is a block diagram (620) showing the event center region (602) with the same mesh regions as the event center region of FIG. 6A. However, the neighborhood surrounding the event center region (602) is reduced in size compared to the second region (604) of FIG. 6A. More specifically, the mesh regions that are determined not to be subject to the neighborhood based upon population values are removed from the second region (604). Accordingly, based upon the population values of the neighborhood of the event center, mesh regions may be removed, thereby reducing the area of the event center.

Besides determining the size and region of an event, the type of the event also needs to be identified. Events may be identified based on the type of the event trigger, the sign of the population value, characteristic quantities, or attributes. The characteristic quantities that are used to determine the event type are size, structure, and shape. The size of the event center is measured by its area. Similarly, and the size of the neighborhood is measured by its area. The structure of the event is defined as one event center and the event neighborhood, multiple event centers and the event neighborhood, or multiple event centers with higher threshold existing in an event center. The event type is determined by the shape of the event center. For example, the shape may be circular, a hollow center surrounded by regions, i.e. known as stadium shape, semi-circular, and linear. After the shape of the event is normalized, pattern matching can be used to determine the shape. For example, it is possible to determine whether the shape is a stadium shape by noting whether there is a hole in the event center. Similarly, it is possible to determine if the shape is linear or circular by the following calculation:

(Event center area)/(Event center periphery).

If the result of the calculation is large, the shape is circular or semi-circular. If the result is small, the shape is determined to be linear. By focusing on the shape of the event neighborhood, it is possible to determine whether the shape is circular or semi-circular. When it is semi-circular, it is assumed that there is no event neighborhood where there is an obstacle.

The length of the portion of the boundary of the event center that is not next to the event neighborhood is defined as L. The length, L, is employed as a factor in determining the shape. It is possible to determine if the shape is circular is semi-circular by the following calculation:

Index=$L$/(Event Center Periphery)

When the value of Index is large, it is determined that the shape is semi-circular. Conversely, when the Index is close to zero, it is determined that the shape is circular.

Figure 7:
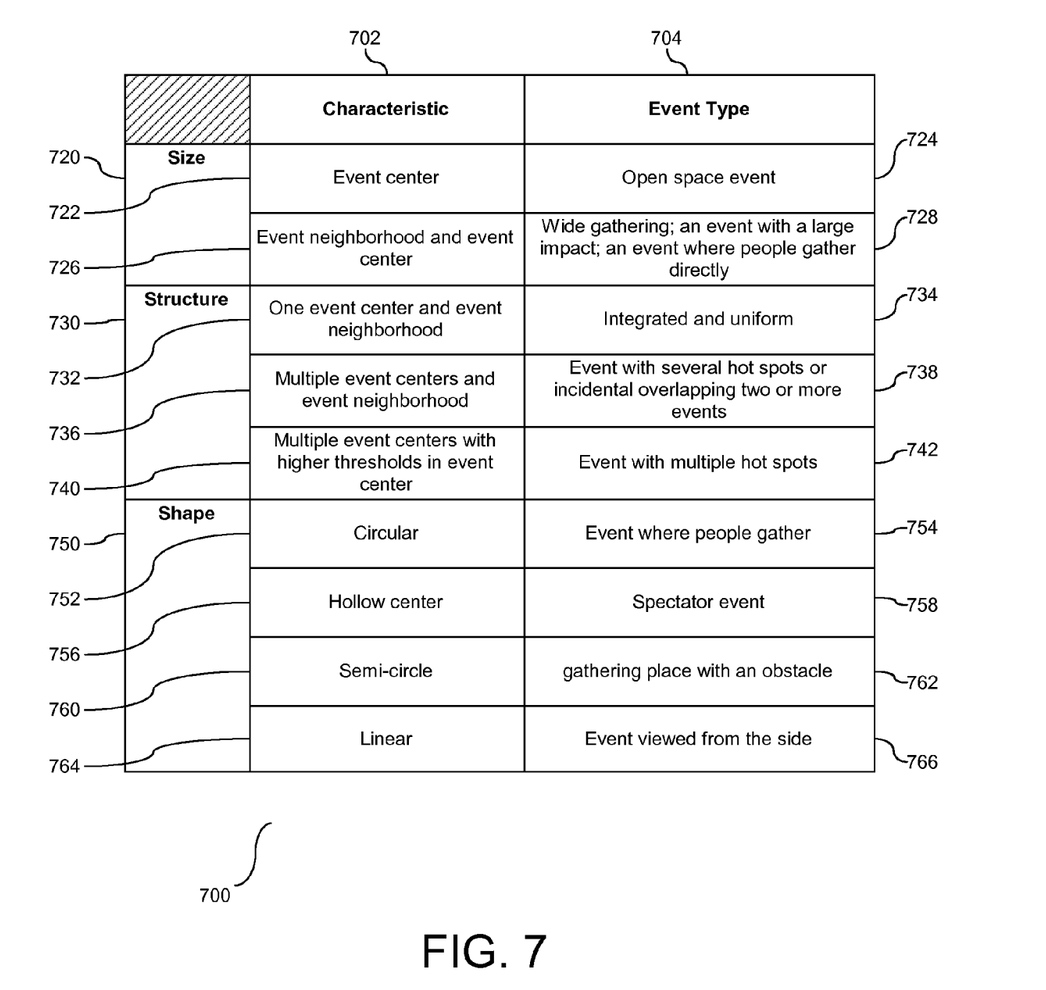
FIG. 7 is a chart associating event size, structure, and shape, with characteristics of a projected event type.

The characteristics of an event based upon the size, shape, and structure of an event center, and/or event neighborhood may be employed to predict future applications of events. FIG. 7 is a chart (700) that associates event size (720), structure (730), and shape (740), with characteristics (702) as an example of a projected event type (704). As shown a size limited to the event center area (722) may be considered an open space event (724), and a size consisting of an event neighborhood area and event center area (726) may be considered to be one of the following: a wide gathering area for a large positive value, an event with a large impact when the value is negative, and an event where people gather directly via URL specification when the value is small (728). With respect to event structure (730), a structure limited to one event center and an event neighborhood (732) may be considered an integrated and uniform event (734). Similarly, a structure consisting of multiple event centers and an event neighborhood (736) may be considered an event with several large hot spots or an incidental overlapping of two or more events (738), and a structure consisting of multiple event centers with high threshold and an event center (742) may be considered an event with multiple hot spots (744). With respect to event shape (740), a circular shape (750) may be considered an event where people naturally gather (752), a shape with a hollow center (754) may be considered a spectator event (756), a semi-circular shape (758) may be considered an event where people gather (760), and a linear shape (760) may be considered an event viewed from the side. Accordingly, the size, shape, and structure of an event may dictate the events that the shape of the event and associated neighborhood are representing.

Based upon the evaluation of size, shape, and structure of the subject mesh regions, behavior in the virtual world may be projected. For example, it may be determined whether the population change in the subject regions is continuous or non-continuous to determine the various types of events that people are either gathering for or leaving.

As shown herein, the event center and neighborhood size is determined in a virtual world. The event center and neighborhood size determination, classification, and type function as a tool for determining behavioral characteristics in the virtual world. In one embodiment, the event center and neighborhood size determination may be implemented in software, which includes but is not limited to firmware, resident software, microcode, etc. The invention can take the form of a computer program product accessible from a computer-useable or computer-readable medium providing program code for use by or in connection with a computer or any instruction execution system. For the purposes of this description, a computer-useable or computer-readable medium can be any apparatus that can contain, or store, for use by or in connection with the instruction execution system, apparatus, or device.

Figure 8:
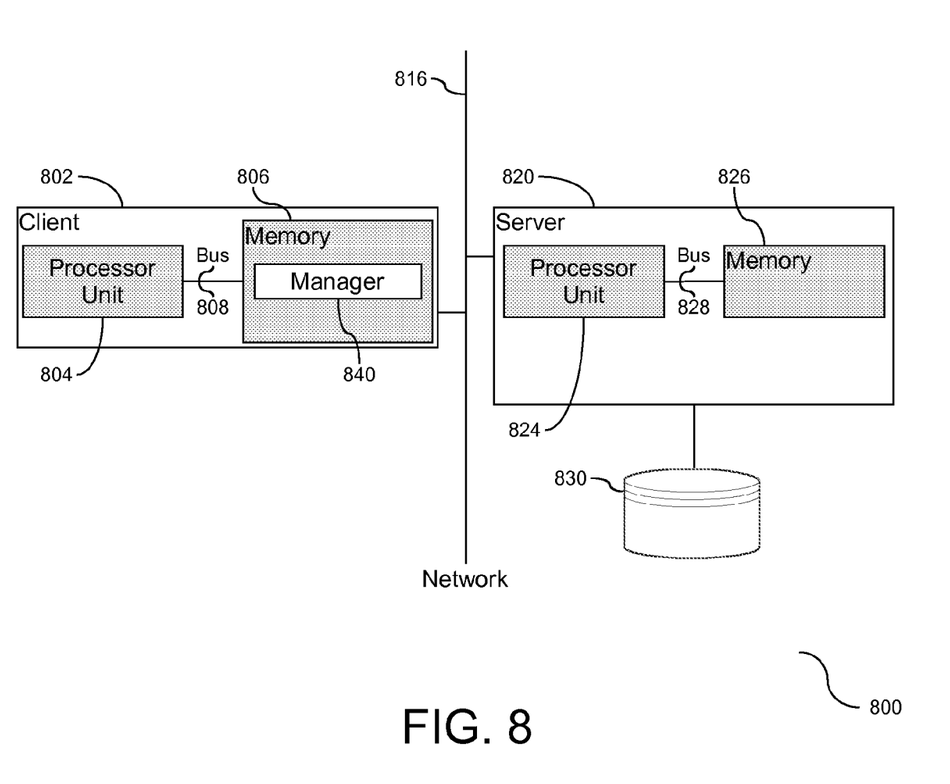
FIG. 8 is a block diagram of a manager in a computer system.

FIG. 8 is a block diagram (800) illustrating placement of a manager in a computer system. The illustration shows a client machine (802) with a processor unit (804) coupled to memory (806) by a bus structure (808). Although only one process unit (804) is shown, in one embodiment, the client (802) may include more processor units in an expanded design. The client is in communication with a server (820) across a network connection (816). The server (820) includes a processor unit (824) coupled to memory (826) by a bus structure (828). The server (820) has a storage device (830) for persistent storage of data. The client (802) is shown with an event detection tool in the form of a manager (840), shown residing in memory (806) of the client (802). The manager (840) evaluates behavior in the virtual world through communication with the server (820). In one embodiment, population data is acquired from the storage device (830) of the server (820). The manager (840) may utilize instructions in a computer readable medium to detect an event in the virtual world. Although the manager (840) is shown residing in memory (806), the invention should not be limited to this embodiment. In one embodiment, the manager (840) may reside as a hardware tool external to memory (806) is implemented as a combination of hardware and software. Accordingly, the manager (840) may be implemented as a software tool or a hardware tool to facilitate evaluation population behavior to detect events in the virtual world.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for detecting an event in a computer simulated virtual world comprising:
    a processor in communication with a storage device to store population data;
    dividing, by the processor, the virtual world into a plurality of detailed areas, each detailed area associated with one or more participants located within the area, said participants representing living individuals;
    acquiring, by the processor, population density data representing a density of participants, a number of participants within the virtual world, and movement information of the participants for each of the detailed areas;
    for each detailed area calculating, by the processor, a change in population density for each unit of time, wherein the change in population density distinguishes between continuous and non-continuous population movement;
    calculating, by the processor, a quantity of participants entries into each of the detailed areas at a specific time;
    setting, by the processor, a threshold value for the population density;
    setting, by the processor, a threshold value for the change in population density;
    setting, by the processor, a threshold value for the quantity of participants entries;
    detecting, by the processor, an event in at least one of the detailed areas responsive to any one of calculated indexes exceeding its set threshold value, said indexes selected from the group comprising: the population density, the change in population density, and the quantity of participants entering each detailed area.

2. The method of claim 1, further comprising determining the size of an event, including defining the center of the event and a neighborhood surrounding the center of the event.

3. The method of claim 2, further comprising estimating the event type, including classifying the event type based on one of the indexes exceeding the threshold.

4. The method of claim 2, further comprising estimating the event type based upon characteristics of the event center and the neighborhood.

5. The method of claim 2, further comprising estimating the event type as a localized event based upon the value of the quantity of entries index exceeding the threshold.

6. The method of claim 5, further comprising classifying the event as an attracting event responsive to the value of the quantity of entries index being positive.

7. The method of claim 5, further comprising classifying the event as a repelling event responsive to the value of the quantity of entries index being negative.

8. The method of claim 1, further comprising identifying events by a size, a structure, and a shape of an event center.

9. The method of claim 1, further comprising determining a type of the event based upon an index defined as a quotient of a length of a portion of a boundary of an event center non-adjacent to an event neighborhood and to a boundary of an event center periphery.

10. An article comprising:
    a non-transitory computer-readable medium including instructions stored therein for causing a computer processor to detect an event associated with participants in a virtual world comprising, the instructions comprising:
        instructions to divide the world into a plurality of detailed areas, each detailed area associated with one or more participants located within the area, said participants representing living individuals;
        instructions to acquire population density data representing a density of participants, a number of participants within the virtual world, and movement information of the participants for each of the detailed areas;
        for each detailed area calculating a change in population density for each unit of time, wherein the change in population density distinguishes between continuous and non-continuous population movement;
        instructions to calculate a quantity of participants entering into one of the detailed areas at a specific time;
        instructions to set a threshold value for the population density;
        instructions to set a threshold value for the change in population density;
        instructions to set a threshold value for the quantity of participants entering each detailed area; and
        an event detected in at least one of the detailed areas responsive to any one of calculated indexes exceeding its set threshold value, said indexes selected from the group comprising: the population density, the change in population density, and the quantity of participants entering each detailed area.

11. The article of claim 10, further comprising instructions to determine the size of an event, including defining the center of the event and a neighborhood surrounding the center of the event.

12. The article of claim 11, further comprising instructions to estimate the event type, including classifying the event type based on one of the indexes exceeding the threshold.

13. The article of claim 11, further comprising instructions to estimate the event type based upon characteristics of the event center and the neighborhood.

14. The article of claim 11, further comprising instructions to estimate the event type as a localized event based upon the value of the quantity of entries index exceeding the threshold.

15. The article of claim 14, further comprising instructions to classify the event as an attracting event responsive to the value of the quantity of entries index being positive.

16. The article of claim 14, further comprising instructions to classify the event as a repelling event responsive to the value of the quantity of entries index being negative.

17. A computer system comprising:
- a processor in communication with memory;
- a storage device in communication with the processor to store population data;
- a virtual world divided into a plurality of detailed areas, each detailed area associated with one or more participants located within the area, said participants representing living individuals;
- a manager in communication with the memory, the manager to acquire population density data representing a density of participants, a number of participants within the virtual world, and movement information for each of the detailed areas;
- the manager to calculate a change in population density for each unit of time for each detailed area, wherein the change in population density distinguishes between continuous and non-continuous population movement;
- the manager to calculate a quantity of participants entering into one of the detailed areas at a specific time;
- a threshold value for the population density;
- a threshold value for the change in population density;
- a threshold value for the quantity of participants entering each detailed area;
- an event detected in at least one of the detailed areas responsive to any one of calculated indexes in excess of a set threshold value, said indexes selected from the group comprising: the population density, the change in population density, and the quantity of participants entering each detailed area.

18. The system of claim 17, further comprising the manager to determine the size of an event, including defining the center of the event and a neighborhood surrounding the center of the event.

19. The system of claim 18, further comprising an estimated event type, including a classification of the event type based on one of the indexes being in excess of the threshold, based upon characteristics of the event center and the neighborhood, and based upon the value of the quantity of entries index being in excess of the threshold.

20. The system of claim 19, further comprising the manager to classify the event as an attracting event responsive to the value of the quantity of entries index being positive, and to classify the event as a repelling event responsive to the value of the quantity of entries index being negative.

* * * * *